Sept. 22, 1925.
W. L. MELVIN ET AL
1,554,871
MEANS FOR APPLYING TREADS TO TIRES
Filed Oct. 25, 1922
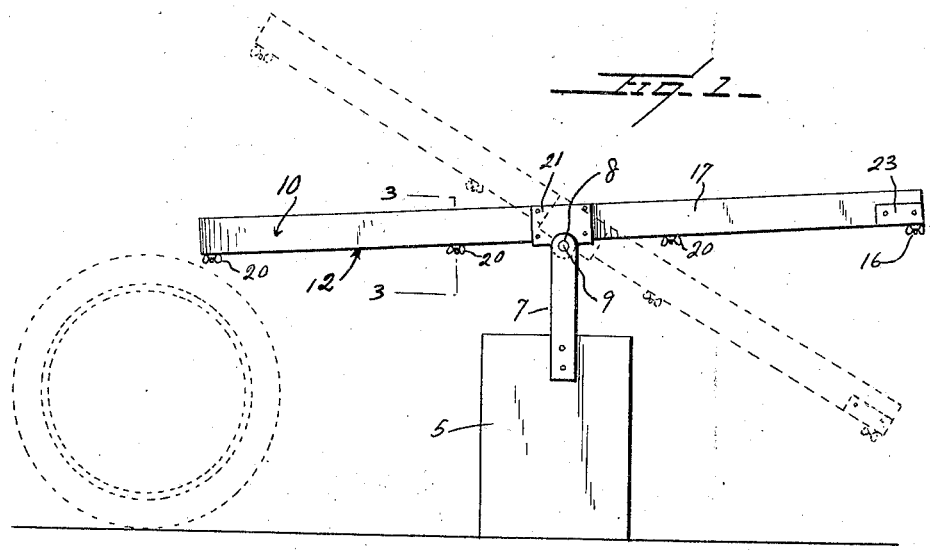
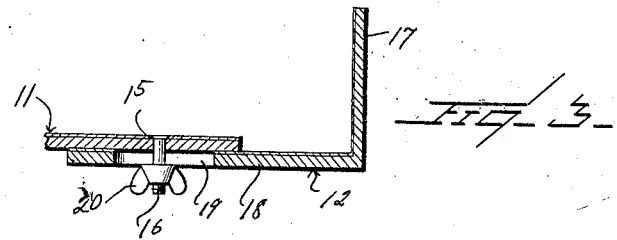
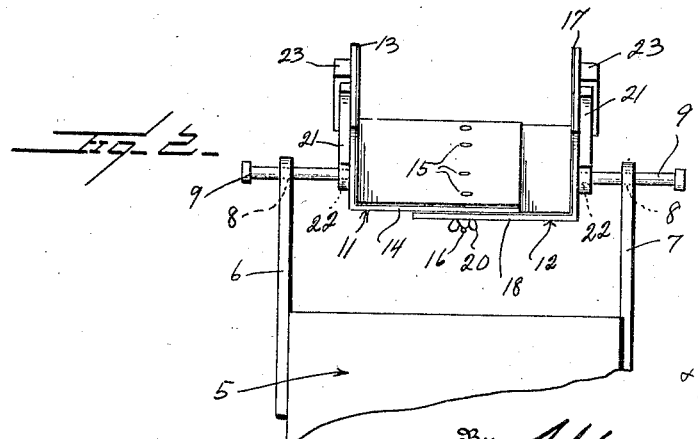

Patented Sept. 22, 1925.

1,554,871

UNITED STATES PATENT OFFICE.

WEBSTER L. MELVIN, OF MORRISVILLE, PENNSYLVANIA, AND JOHN E. CHAMPION, OF TRENTON, NEW JERSEY.

MEANS FOR APPLYING TREADS TO TIRES.

Application filed October 25, 1922. Serial No. 596,797.

*To all whom it may concern:*

Be it known that we, WEBSTER L. MELVIN and JOHN E. CHAMPION, citizens of the United States, residing at Morrisville and Trenton, respectively, in the counties of Bucks and Mercer, respectively, and States of Pennsylvania and New Jersey, respectively, have invented certain new and useful Improvements in Means for Applying Treads to Tires, of which the following is a specification, reference being had to the accompanying drawings.

This invention relates to means for applying a tread to a tire and has for its object to provide means of this character capable of being used in connection with machines used in the manufacture of tire carcasses.

It is another object of the invention to provide means of this character capable of being adjusted according to the width of the tread to be applied and which assures a true application of the tread to the tire carcass.

It is a further object of the invention to provide means of this character capable of guiding the tread from the machine to the tire carcass and wherein said means may be moved to suit the size of the tire and also moved out of the way when not in use.

With these and other objects in view, the invention consists in the improved construction and arrangement of parts to be hereinafter more particularly described, fully claimed and illustrated in the accompanying drawings, in which:—

Figure 1 is a side elevation of a tire tread chute constructed in accordance with an embodiment of the invention;

Figure 2 is an end elevation showing the chute tilted;

Figure 3 is a detailed sectional view taken on the line 3—3 of Figure 1.

In carrying out our invention, we provide a novel device capable of being used in connection with various types of tire machines to apply the tread in an accurate manner. This means comprises a support 5 which may be of any shape desired and of such a construction as to prevent the same from tilting in any way. Projecting from the sides of the support are arms 6 and 7, each arm consisting of a strip of metal having a bearing opening 8 in its upper end, said bearing openings registering with each other. Mounted in the openings 8 is a supporting shaft 9.

In connection with the support, a novel form of chute 10 is used. This chute comprises sections 11 and 12. The section 11 includes a side wall 13 and a bottom member 14, the bottom member 14 having a plurality of openings 15 adapted to receive the heads of adjusting bolts 16, said bolts being disposed at spaced intervals longitudinally of the bottom member 14. The section 12 comprises a side wall 17 and a bottom member 18 adapted to extend beneath the bottom member 14 of the section 11. The bottom member 18 is provided with a plurality of laterally extending elongated slots 19 adapted to receive the shanks of the adjusting screws 16. Adjusting nuts 20 are carried by said shanks for engagement with the lower face of the bottom member 18 to clamp the bottoms 14 and 18 in the desired adjusted positions relative to each other. By this means the width of the chute can be regulated to suit the tread to be applied. The sections 11 and 12 may be either constructed of metal or wood. If constructed of wood each of said sections may be lined with any suitable metal.

Carried by the central portion of the side member 17 and the central portion of the side member 13, are bearing plates 21, said plates extending below the bottom of said sections and having bearing openings 22 adapted to receive the shaft 9. It will be noted that the arms 6 and 7 of the support are disposed in spaced relation to the bearing plates 21. The purpose of this is to permit the plates 21 to be moved toward and away from each other according to the adjustment of the chute.

The rear end portions of the sections 11 and 12 are provided with weights 23 secured to the sides of said sections. The purpose of these weights is to cause the rear end of the chute to swing downwardly so as to move the forward end out of the way when not in use.

In the use of the device it is possible with some types of machines to attach the chute direct to the machine. Other types of machines require a support similar to the support 5. The forward end of the chute is extended downwardly to a point just over the top of the crown of the tire carcass which has previously been completed on the machine and is ready for the tread. The end of the tread is then laid on the top of the crown and the tread drawn from the chute and laid accurately on the tire carcass. In view of the fact that the tread feeds from the chute direct to the top of the crown of the tire carcass, there is no possibility of the tread wrinkling.

From the foregoing it will be readily seen that this invention provides novel means for applying a tread to a tire carcass with little time, labor and expense and with great accuracy, as the laying of the tread does not depend on the skill of the operator. All of these features are possessed by this device which is composed of only a small number of simple parts and which may be used in connection with various tire machines.

What is claimed is:—

A device of the character described comprising a stationary support, uprights secured upon opposite sides thereof and extending above the top, a shaft extending through said uprights, a pair of plates journaled upon said shaft, a pair of longitudinally extending trough forming members of angular formation secured intermediate their ends to said plates, means for adjusting said members toward or from each other, the plates and trough forming members being bodily rockable upon the shaft whereby to be disposed in a selected position depending upon the diameter of the tire carcass being treaded, and counterbalancing weights on one end of the trough forming members for normally urging said end downwardly.

In testimony whereof we hereunto affix our signatures.

WEBSTER L. MELVIN.
JOHN E. CHAMPION.